US012242995B2

United States Patent
Luo et al.

(10) Patent No.: US 12,242,995 B2
(45) Date of Patent: Mar. 4, 2025

(54) ENVIRONMENT CHANGE MANAGEMENT AND RISK ANALYSIS

(71) Applicant: INTERNATIONAL BUSINESS MACHINES CORPORATION, Armonk, NY (US)

(72) Inventors: Chen Luo, Beijing (CN); Fu F W Wang, Xian (CN); Shi Jie Zhang, Xi'An (CN); Lei Gao, Xian (CN); Sun Bing, Xian (CN); Meng Ru Hou, Xi'An (CN); Yu Heng Liu, Xi'An (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 722 days.

(21) Appl. No.: 17/443,259

(22) Filed: Jul. 23, 2021

(65) Prior Publication Data

US 2023/0028044 A1    Jan. 26, 2023

(51) Int. Cl.
| | |
|---|---|
| *G06Q 10/0637* | (2023.01) |
| *G06F 16/28* | (2019.01) |
| *G06Q 10/0635* | (2023.01) |
| *G06Q 10/067* | (2023.01) |

(52) U.S. Cl.
CPC ..... *G06Q 10/06375* (2013.01); *G06F 16/283* (2019.01); *G06Q 10/0635* (2013.01); *G06Q 10/067* (2013.01)

(58) Field of Classification Search
CPC ........ G06Q 10/00–50/00; G06F 1/00–2200/00

USPC .................................................. 705/7.11–7.42
See application file for complete search history.

(56) References Cited

U.S. PATENT DOCUMENTS

| | | | | |
|---|---|---|---|---|
| 6,684,206 | B2 * | 1/2004 | Chen ...................... | G06Q 10/10 |
| 6,993,534 | B2 * | 1/2006 | Denesuk ............. | G06F 16/9532 |
| | | | | 713/168 |
| 7,031,955 | B1 * | 4/2006 | de Souza ............... | G06Q 10/00 |
| 7,356,482 | B2 | 4/2008 | Frankland | |
| 7,945,589 | B1 | 5/2011 | Weiss | |
| 9,460,172 | B2 * | 10/2016 | Gong .................... | G06F 16/254 |

(Continued)

OTHER PUBLICATIONS

Hellerstein et al., "The CHAMPS system: change management with planning and scheduling", https://ieeexplore.ieee.org/document/1317679, ResearchGate, Jan. 2004, pp. 1-17.

(Continued)

*Primary Examiner* — Alan S Miller
(74) *Attorney, Agent, or Firm* — Amin, Turocy & Watson, LLP

(57) ABSTRACT

The exemplary embodiments disclose a method, a computer program product, and a computer system for managing environment change. The exemplary embodiments may include determining a plurality of change and risk models for a plurality of computing environments, generating a plurality of association rules based on the plurality of change and risk models, and generating a joint association rule by combining at least two of the plurality of association rules, wherein the joint association rule indicates, from the three dimensions, an association relationship between changes and risk events over at least a part of the time series.

20 Claims, 8 Drawing Sheets

(56) References Cited

U.S. PATENT DOCUMENTS

| | | | |
|---|---|---|---|
| 11,762,753 B2* | 9/2023 | Everman | G06N 3/09 |
| | | | 702/186 |
| 2010/0110933 A1 | 5/2010 | Wilcock | |
| 2015/0142630 A1* | 5/2015 | Benouarets | G06Q 40/00 |
| | | | 705/35 |
| 2016/0283875 A1* | 9/2016 | Birdi | G06Q 10/0635 |
| 2019/0334909 A1 | 10/2019 | Schmitt | |
| 2020/0019911 A1* | 1/2020 | Powers | G06F 16/24578 |
| 2020/0412625 A1 | 12/2020 | Bagarolo | |
| 2023/0028044 A1* | 1/2023 | Luo | G06F 16/283 |

OTHER PUBLICATIONS

Mell et al., "The NIST Definition of Cloud Computing", National Institute of Standards and Technology, Special Publication 800-145, Sep. 2011, pp. 1-7.

Vukovic et al., "Cloud migration using automated planning", https://ieeexplore.ieee.org/abstract/document/7502801, 2016, IEEE/IFIP Network Operations and Management Symposium (NOMS 2016), pp. 1-8.

* cited by examiner

ENVIRONMENT CHANGE MANAGEMENT AND RISK ANALYSIS

BACKGROUND

The present disclosure generally relates to information analysis techniques and, more particularly, to environment change management and risk analysis.

Nowadays, cloud computing is very popular and dedicated computing environments can be provided by cloud service providers to their consumers. It is common practice for the consumers and cloud service providers to apply changes to the computing environments, to upgrade software components, add new add-ons or features, change application configurations, and so on. There may be a risk that some of the changes cause undesirable events such as performance degradation, add-on version conflicts, security breach, and the like. Change management and risk analysis are needed to avoid potential risk events occurred against the running computing environments.

SUMMARY

According to one embodiment of the present disclosure, there is provided a computer-implemented method. According to the method, a plurality of change and risk models are determined for a plurality of computing environments. Each change and risk model has three dimensions to indicate respective changes applied to one of the plurality of computing environments along with respective risk events occurred in the computing environment over a time series. A plurality of association rules are generated based on the plurality of change and risk models, where each association rule indicates, from two of the three dimensions, an association relationship between two of the following: at least one change, at least one risk event, and at least one time point of the time series. A joint association rule is generated by combining at least two of the plurality of association rules, to indicate, from the three dimensions, an association relationship between changes and risk events over at least a part of the time series.

According to a further embodiment of the present disclosure, there is provided a system. The system comprises a processing unit; and a memory coupled to the processing unit and storing instructions thereon. The instructions, when executed by the processing unit, perform acts of the method according to the embodiment of the present disclosure.

According to a yet further embodiment of the present disclosure, there is provided a computer program product being tangibly stored on a non-transient machine-readable medium and comprising machine-executable instructions. The instructions, when executed on a device, cause the device to perform acts of the method according to the embodiment of the present disclosure.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Figure 1:
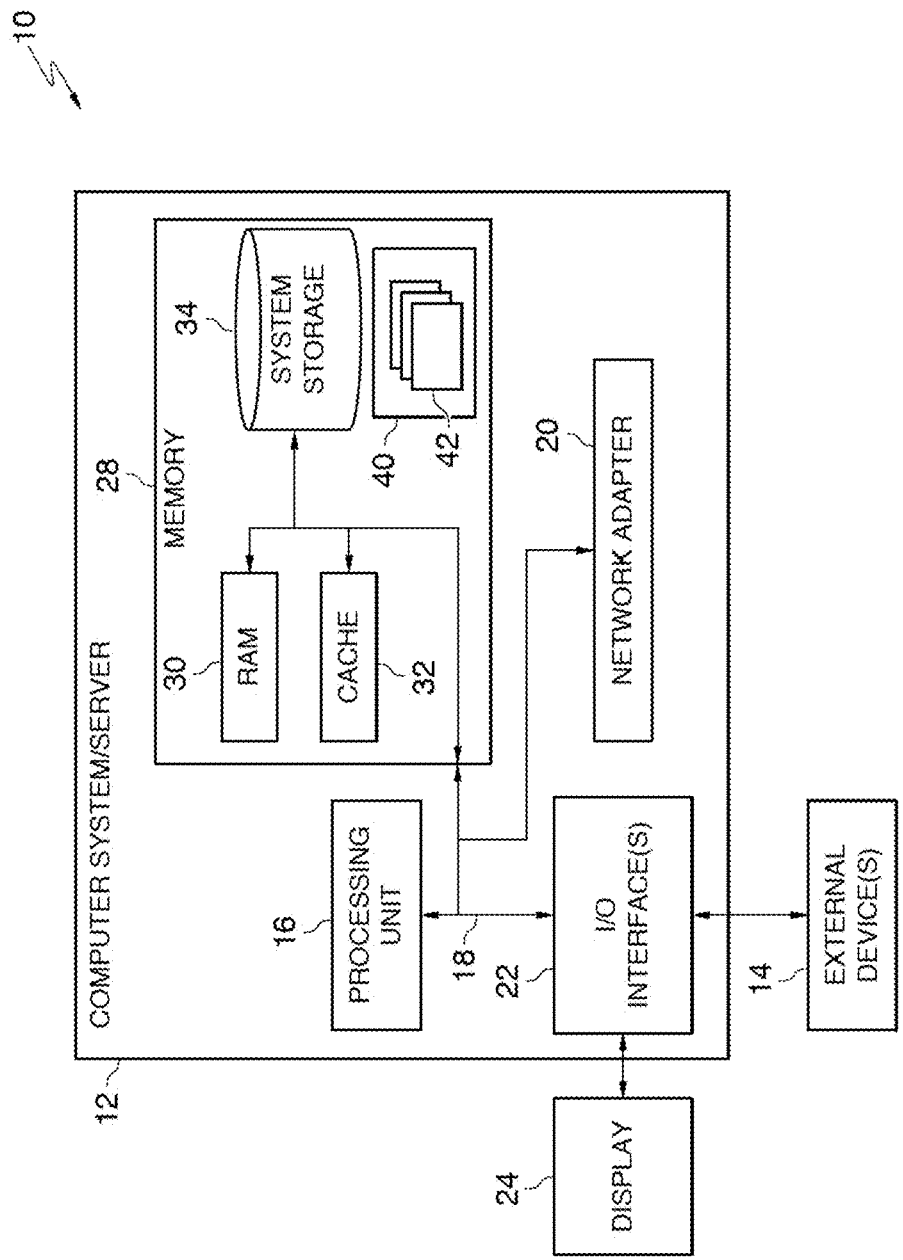
FIG. 1 depicts an exemplary block diagram depicting hardware components according to some embodiments of the present disclosure.

FIG. 1 depicts a block diagram of devices in accordance with the exemplary embodiments. It should be appreciated that FIG. 1 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
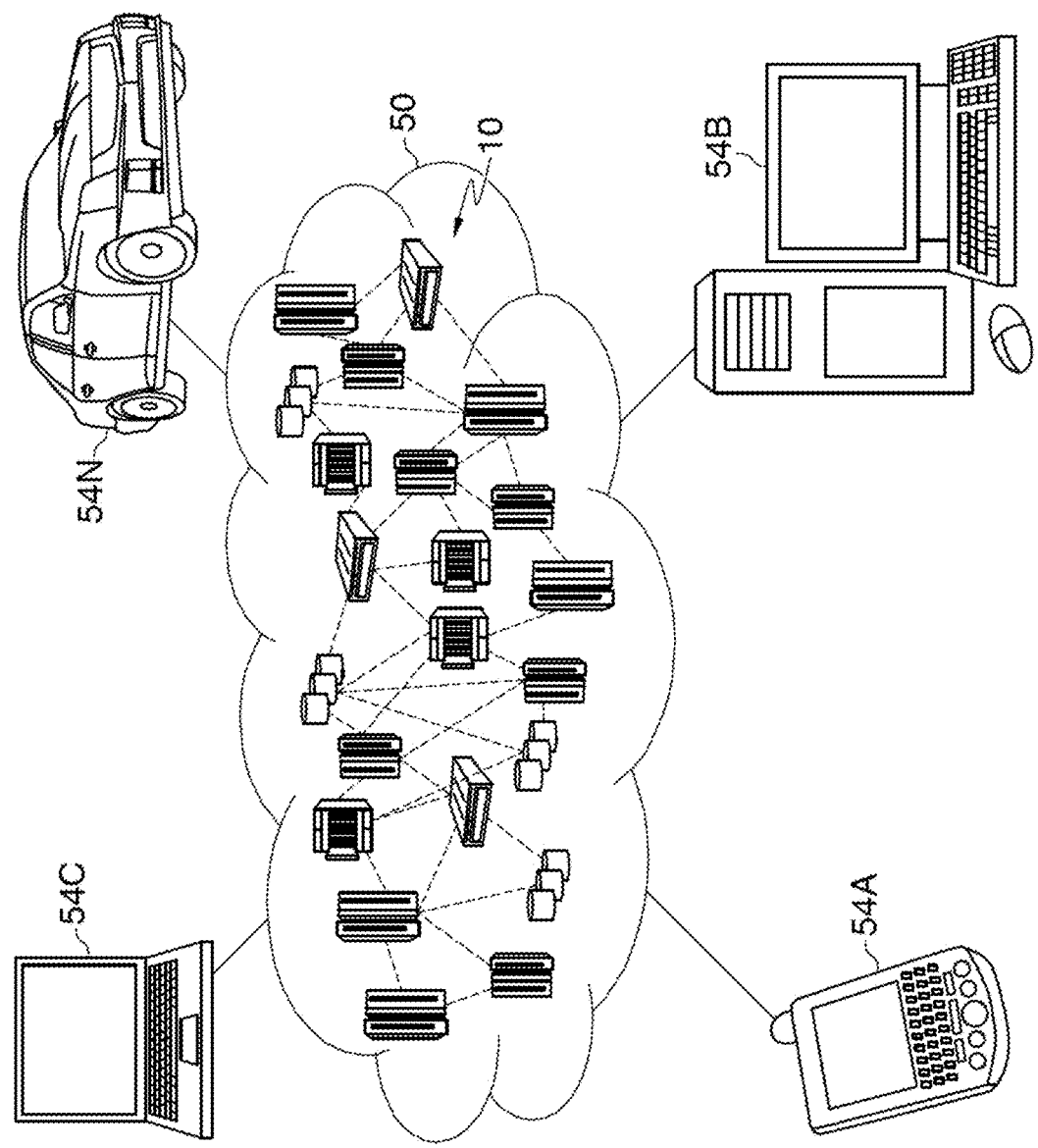
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 3:
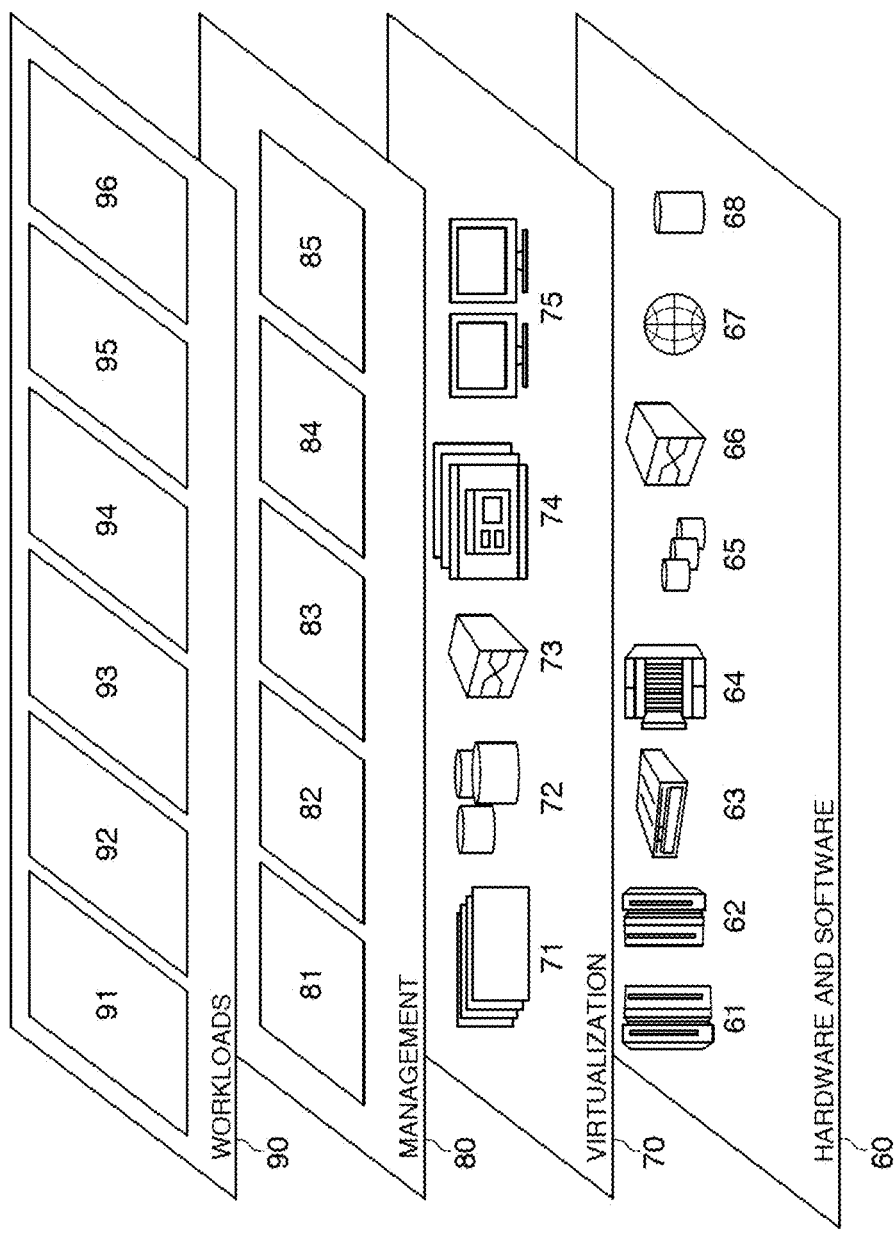
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and environment change management 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a "machine learning network" is an artificial intelligence (AI) model, which may also be referred to as a "learning network", "learning model", "network model", or "model." These terms are used interchangeably hereinafter. In general terms, machine learning is to construct a system that can learn from training data. A deep learning network is one example machine learning network, examples of which include a "neural network (NN)."

With the increasing popularity of computing environments provisioned, it becomes a challenge to perform an efficient, consistent, and proactive change management along with risk analysis across customers and environments in an automatic way. Existing change management is mostly manual. There is no solution in field to correlate change management with risk analysis, and the existing solutions cannot meet future change management requirement on dedicated computing environments, which have higher complexity, intensity, and intelligence.

According to embodiments of the present disclosure, there is proposed a solution for environment change management and risk analysis. In this solution, environment changes and risk events along with time are modeled to perform change management and risk analysis on computing environment in an automatic, consistent and proactive manner.

Figure 4:
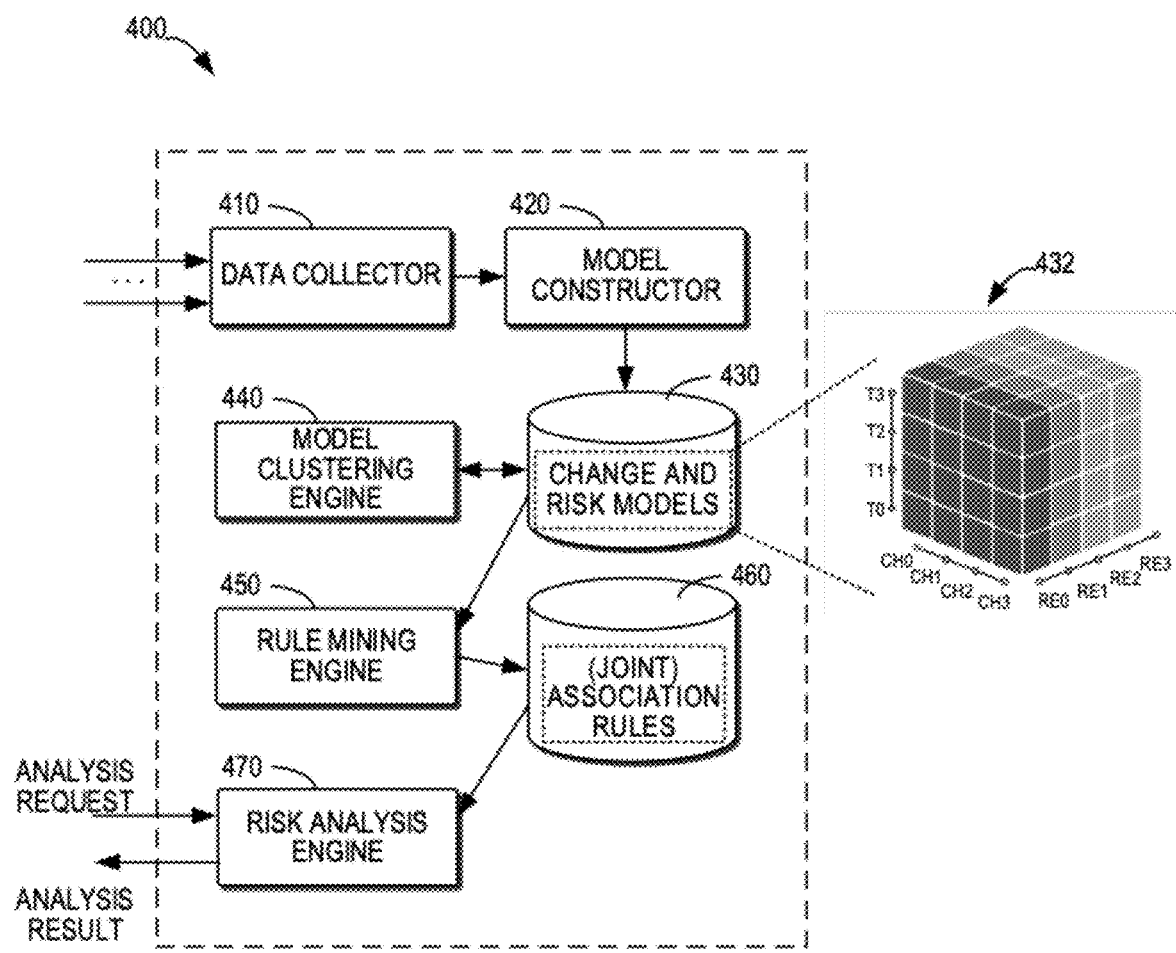
FIG. 4 depicts a block diagram of a system for change management and risk analysis according to some embodiments of the present disclosure.

Reference is made to FIG. 4, which illustrates a block diagram of a system 400 for change management and risk analysis according to some embodiments of the present disclosure. As illustrated, the system 400 comprises a data collector 410, a model constructor 420, model storage 430, a model clustering engine 440, a rule mining engine 450, rule storage 460, and a risk analysis engine 470, to implement various embodiments of the present disclosure.

It would be appreciated that the system 400 may be implemented by one or more computing systems or devices having computing and storage capability. For example, the system 400 may be implemented by one or more computing platforms, servers, mainframes, general-purpose computing devices, and/or the like.

It would also be appreciated that the components of the system 400 shown in FIG. 4 may be implemented as one or more software engines, components, or the like, which are configured with logic for implementing the functionality attributed to the particular module. Each component may be implemented using one or more of such software engines, components or the like. The software engines, components, and the like are executed on one or more processors of one or more computing systems or devices and utilize or operate on data stored in one or more storage devices, memories, or the like, on one or more of the computing systems.

The system 400 is configured to perform change and risk event management on computing environments by building three-dimensional (3D) change and risk models to represent changes along with risk events happened in the computing environments over a time series. The system 400 is also configured to mine association relationships between the changes, risk events, and the time series which can be used for risk analysis on one or more target computing environment.

The construction of change and risk models is first introduced before discussing the association rule mining and the risk prediction in the embodiments of the present disclosure.

Construction and Clustering of Change and Risk Models

The model constructor 420 in the system 400 is configured to create a change and risk model for a computing environment. The system 400 may perform the change and risk management for multiple computing environments, and accordingly the model constructor 420 may create a change and risk model for each of the computing environments.

The computing environments may comprise any computing environments in which services and applications can be deployed for execution. A computing environment may be configured with infrastructure to provide hardware, software, and/or middleware resources for executing services and applications. In some embodiments, the computing environments may be one or more cloud environments. In some embodiments, the computing environments may comprise one or more dedicated cloud environments, such as SaaS environments.

Various changes may be applied to the computing environments during their lifecycles by consumers and/or by the providers of the computing environments. In some cases, a change applied to a computing environment may lead to a risk event incurred in the computing environment.

In embodiments of the present disclosure, a change and risk model is proposed to represent respective changes applied to a computing environment along with respective risk events occurred in the computing environment over a time series. Such a change and risk model may be constructed as a 3D cube with three dimensions corresponding to the changes, risk events, and time series, respectively. An example change and risk model 432 is schematically illustrated in FIG. 4.

The data collector 410 in the system 400 may be configured to collect data related to changes applied to and risk events happened in the computing environments. The data collector 410 may collect the related data from various sources related to the computing environments.

In some embodiments for risk events occurred in a computing environment, the data collector 410 may monitor alters from an internal monitoring alert system, incidents reported by customers, other issues reported by the consumers. Example risk events occurred a computing environment may include, but are not limited to, performance degradation such as slow query responses, lower result accuracy, compatibility issues, add-on version conflicts, security breach, server down/hung/crash, application down/hung/crash, and any other issues occurred in the computing environment.

In some embodiments, the data collector 410 may monitor and record the changes that are submitted by the consumers and/or providers and applied to a computing environment. Example changes applied to a computing environment may include, but are not limited to, version upgrades, application configuration changes, add-on changes, hardware device changes such as disk capacity, memory or processing device changes, network allowed-listing changes, and any other changes that may be applied on the computing environment.

The model constructor 420 may obtain the data collected by the data collector 410 to create the change and risk models for the computing environments. To align the risk events and changes for a certain computing environment when creating the change and risk model, for each risk event, the model constructor 420 may represent changes that have been applied on the certain computing environment when and before this risk event happens. The created change and risk models may be stored into the model storage 430.

As illustrated in FIG. 4, the example change and risk model 432 in the 3D cube structure indicates respective changes ("CH") in the change dimension, such as CH0, CH1, CH2, and CH3; respective risk events ("RE") in the risk event dimension, such as RE0, RE1, RE2, and RE3. With the time series ("T") dimension, it is possible to indicate changes applied to the computing environment along with the risk event occurred over the time series such as T0, T1, T2, and T3. It should be understood that the numbers of changes, risk events, and time points in the example change and risk event model 432 are merely examples, and other numbers are possible in actual cases.

It is noted that the time series in a change and risk model indicate the order of changes applied on a computing environment or the order of risk events happened in the computing environment. The time points in the time series may not need to record the exact time stamps when the changes or risk events happened.

With the change and risk model in the three dimensions for each computing environment, it is convenient to capture and analyze the changes across the risk event and the risk events across the changes. In each change and risk model, an atomic dice of the 3D cube structure may represent a change applied to a computing environment along with a risk event occurred at a certain time point.

The 3D cube structure may be sliced from different dimensions, with each slice specific to a certain risk event, a certain change, or a certain time point. The slice may represent occurrence of the items in two of the three dimensions with an item in the remaining dimension fixed.

Figure 5A:
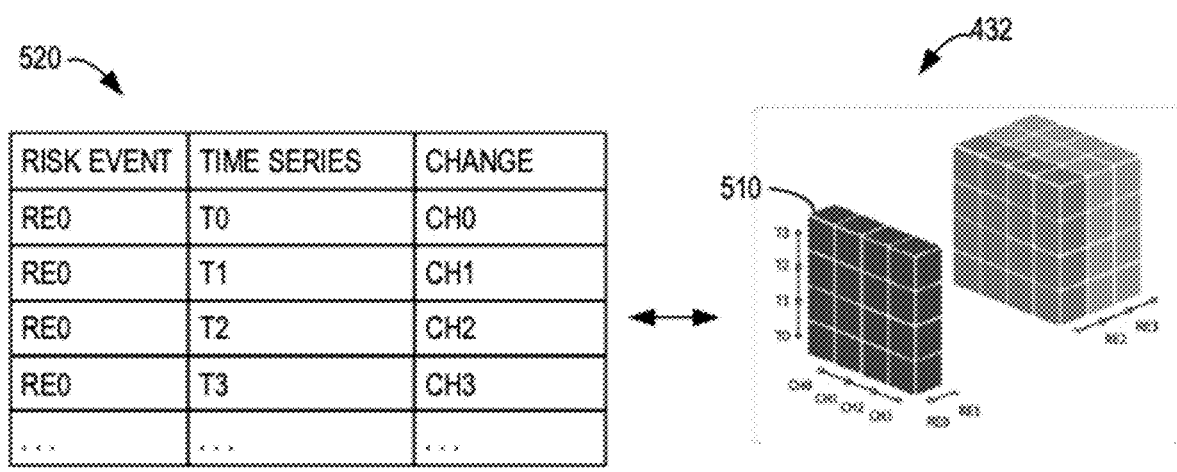
FIG. 5A depicts an example slice of a cube structure representing the example change and risk model according to some embodiments of the present disclosure.

More specifically, a slice of the 3D cube structure specific to a risk event may indicate respective changes applied to a computing environment along with that risk event occurred in the computing environment over a time series. FIG. 5A illustrates an example slice 510 of a 3D cube structure representing the example change and risk model 432. The slice 510 is specific to a risk event "RE0," to indicate changes from CH0 to CH3 applied across T0 to T1 to the computing environment. The slice 510 may be represented in a flat structure as a table 520, which has three columns "risk event," "time series," and "change."

In addition, a slice of the 3D cube structure specific to a change may indicate the change applied to a computing environment along with respective risk events occurred in the computing environment over a time series. A slice of the 3D cube structure specific to a time point may indicate respective changes applied to a computing environment along with respective risk events occurred in the computing environment at the time point.

Figure 5B:
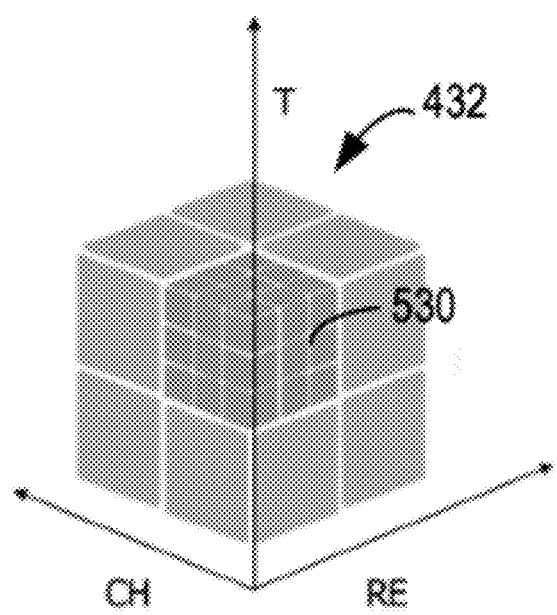
FIG. 5B depicts an example dice of a cube structure representing the example change and risk model according to some embodiments of the present disclosure.

In addition, a dice of the 3D cube structure may represent changes, risk events, and time points within respective ranges. FIG. 5B illustrates an example dice 530 of a 3D cube structure representing the example change and risk model 432. For example, the dice 530 is between CH2 and CH3, indicating risk events occurred between the time points when CH2 and CH3 applied.

The structure of the change and risk model allows flexible analysis the change(s) and risk event(s) of the computing environment through the atomic dices, slices, and various sizes of dices. It would be appreciated that although illustrated as a 3D structure, a change and risk model may also be represented in a flat structure, such as a table, to indicate the applied changes and risk events occurred over a time series.

As the model constructor 420 may create the change and risk models for various computing environments, each having different characteristics. To facilitate following risk analysis, in some embodiments, the model clustering engine 440 may be configured to cluster the change and risk models built for different computing environments into one or more clusters. The model clustering engine 440 may obtain the created change and risk models stored in the model storage 430 to process.

In some embodiments, the model clustering engine 440 may cluster a set of change and risk models created for different computing environments based on characteristics related to the computing environments. Various characteristics related to the computing environments may be taken into account. In some embodiments, the characteristics may include, but are not limited to, versions of the computing environments, application cluster set ups, application configurations, information related to the consumers of the computing environments (such as single sign on (SSO) information, security assertion markup language (SAML) information, or the like), the types or versions of the hardware, software and/or middleware resources (such as the virtual private network (VPN) type or version, the database (DB) type or version, middleware type or version, and the like), information related to third-party integration, disaster recovery (DR), geographical regions covered by the computing environments, and any other characteristic related to the computing environments.

Figure 6:
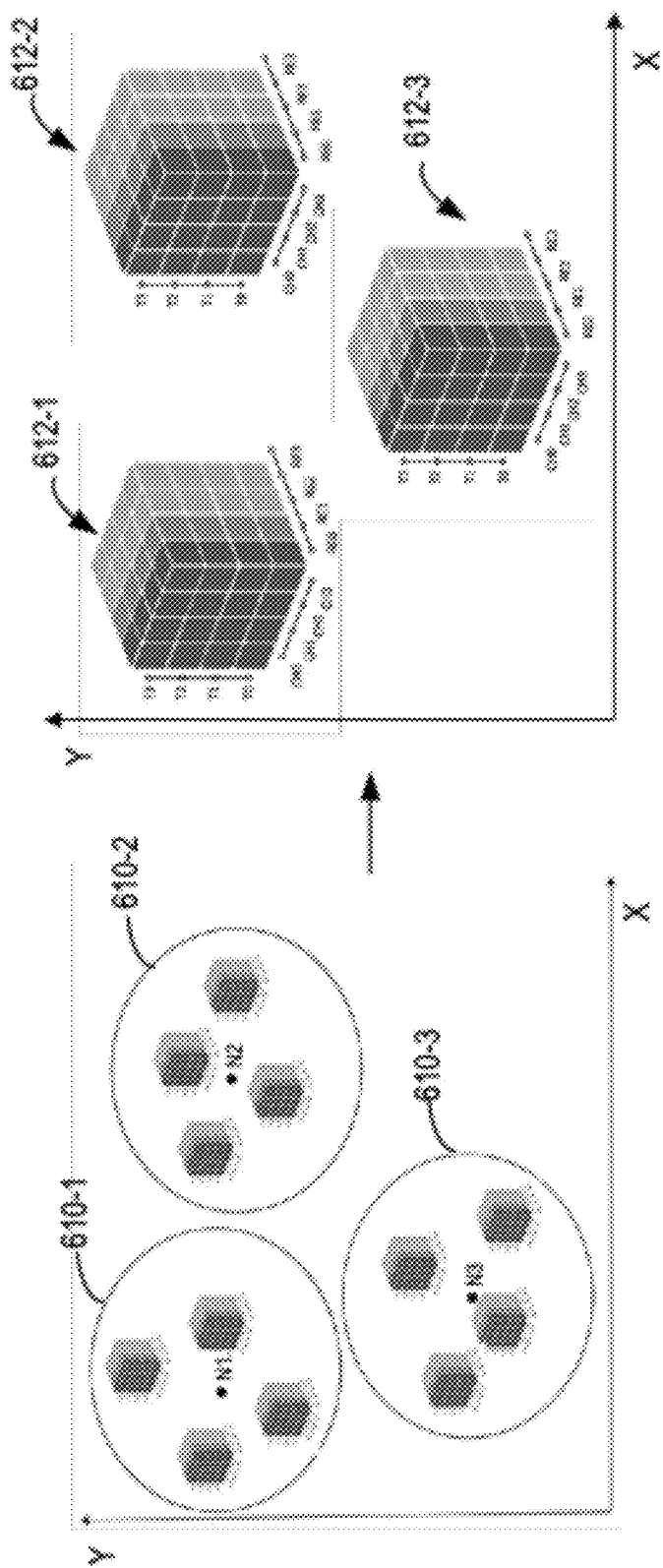
FIG. 6 depicts example model clustering and generation of generic models for respective clusters according to some embodiments of the present disclosure.

The model clustering engine 440 may apply various clustering algorithm to perform the characteristic-based clustering. As illustrated in FIG. 6, the change and risk models may be grouped into clusters 610-1, 610-2, 610-3 (collectively or individually referred to as clusters 610), each cluster with a center node N1, N2, and N2. Each cluster 610 comprises a plurality of change and risk models for computing environments with matching or similar characteristics.

In some embodiments, the model clustering engine 440 may be configured to generate a generic change and risk model for each cluster. The change and risk models in each cluster may be utilized for mining association rules, as will be discussed in the following. The generic change and risk model may be stored into the model storage 430 and used to assist in the mining of the association rules.

It is assumed that K change and risk models are included a cluster 610 with a center node Nk is represented as the follows:

$EN1 = (T1, CH1, RE1), (T2, CH2, RE2) \ldots$ $EN2 = (T1, CH1', RE1'), (T2, CH2', RE2') \ldots$ $EN3 = (T1, CH1'', RE1''), (T2, CH2'', RE2'') \ldots$ $ENK = \ldots$ The K change and risk models included the cluster 610 may be broken up according to the risk events and are combined into the generic change and risk model generated for the cluster 610 with the center node Nk. It is assumed that there are J clusters, and the generation of the generic change and risk models may be represented as follows:

$CL1 = (T1, N11*CH1 + N12*CH1' + N13*CH1'',$
$\quad N11*RE1 + N12*RE1' + N13*RE1'') \ldots$ $CL2 = (T1, N21*CHa + N22*CHa' + N23*CHa'',$
$\quad N21*REa + N22*REa' + N23*REa'') \ldots$ $CL3 = (T1, N31*CHb + N22*CHb' + N33*CHb'',$
$\quad N31*REb + N32*REb' + N33*REb'') \ldots$ $CLJ = \ldots$ where "CL1," "CL2," "CL3," . . . "CLJ" represents the generic change and risk models generated to the J clusters 610, respectively; Nij represents the combination weights for the changes and risk events in each cluster.

As illustrated in FIG. 6, generic change and risk models 612-1, 612-2, and 612-3 (collectively or individually referred to as change and risk models 612), are generated for the clusters 610-1, 610-2, 610-3. It is noted that although illustrated with the same denotations, the changes and risk events in the change and risk models 612 may be the same or be different.

In embodiments of the present disclosure, with the introduction of the change and risk model, the 3D Cube structure may be easily expanded and operated, which provides flexibility on customization and integration.

The use of the individual change and risk models in each cluster and the generic change and risk model will be discussed in detailed in the following.

Generation of Association Rules

The rule mining engine 450 in the system 400 is configured to determine a plurality of association rules based on change and risk models. In some embodiments, the change and risk models grouped within one cluster may be explored to determine a set of association rules for this cluster. As such, the association rules determined for one cluster may be suitable for risk analysis against one or more computing environments with matching or similar characteristics as the computing environments for which the clustered change and risk models are created.

An association rule determined from the change and risk models may indicate an association relationship from two of the change, risk event, and time series dimensions with a specific item in the remaining dimension fixed. The rule mining engine 450 may determine an association rule for a specific change, risk event, or time point based on the slice corresponding to the specific change, risk event, or time point in the 3D cube structure of a change and risk model.

Figure 7:
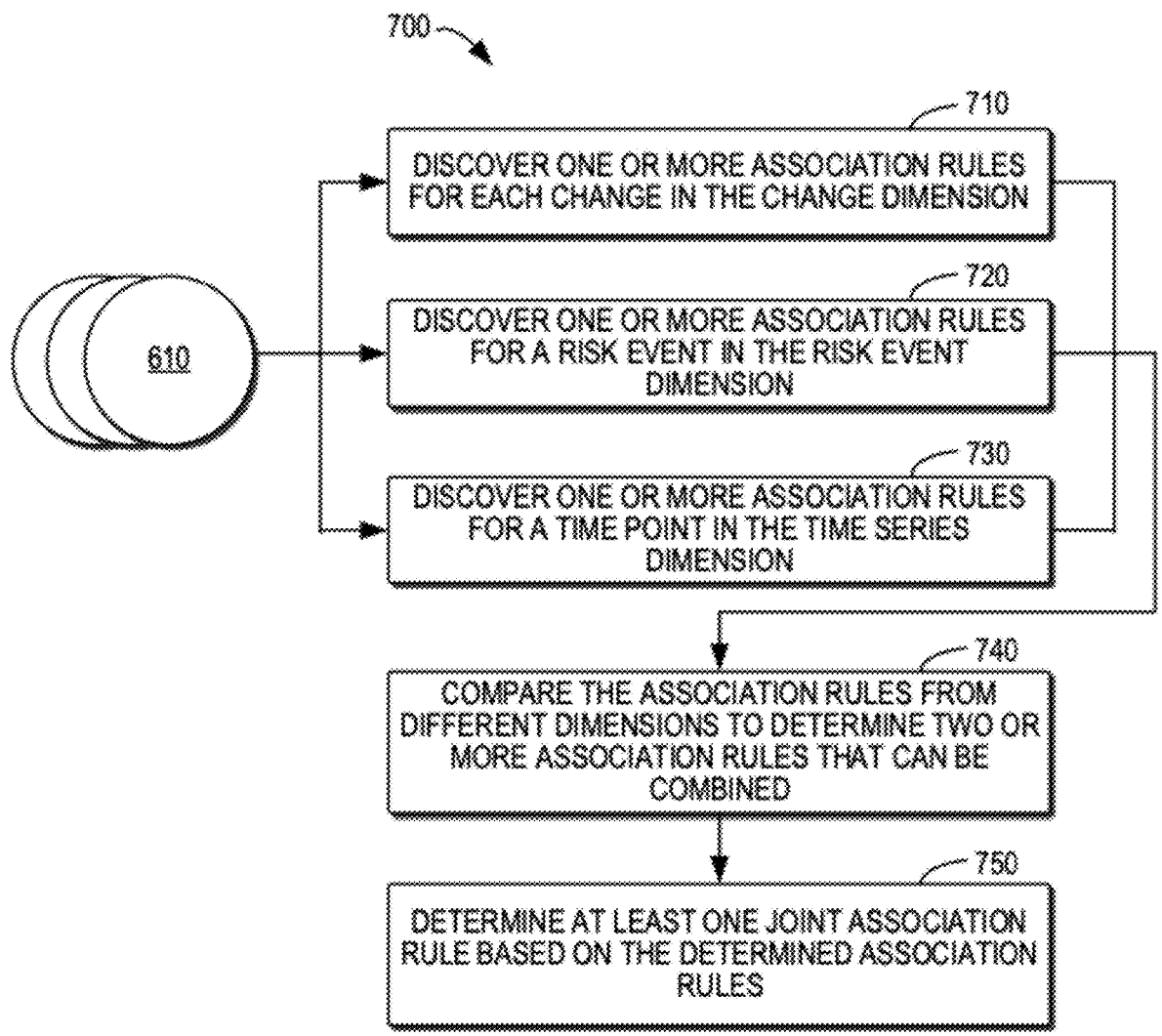
FIG. 7 depicts a flowchart of an example process for association rule mining according to some embodiments of the present disclosure.

FIG. 7 depicts a flowchart of an example process 700 for association rule mining according to some embodiments of the present disclosure. The rule mining engine 450 is configured to mine one or more association rules for each of the change, risk event, and time series dimensions.

At block 710, the rule mining engine 450 attempts to determine one or more association rules for each change in the change dimension. An association rule for a specific fixed change in the change dimension may indicate an association relationship between one or more risk events over one or more time points in the time series. From this association rule, it can be determined that the risk events will frequently or always occur along with time if the specific change is applied to a computing environment. Such an association rule may be used to predict an upcoming risk event over time in the case that the specific change is implemented in a computing environment.

The rule mining engine 450 may attempt to discover the association rule(s) for each change based on two-dimensional (the risk event and time series dimensions) indicated by the change and risk models in a cluster 610. The rule mining engine 450 may extract slices of the 3D cubes of the change and risk models that are corresponding to the specific change. Thus, with a specific change fixed in the change dimension, the risk events occurred in the computing environments over the time series may be extracted from the change and risk models in the cluster 610. Risk event-time point pairs may be analyzed against the specific change, to determine whether there is an association rule for the change.

At block 720, the rule mining engine 450 attempts to determine one or more association rules for each risk event in the risk event dimension. An association rule for a specific fixed risk event in the risk event dimension may indicate an association relationship between one or more changes over one or more time points in the time series. From this association rule, it can be determined that the changes can be found to be applied along with time when the specific risk event occurs in a computing environment. Such an association rule may be used for root cause analysis (RCA) when a risk event occurs in a computing environment, to determine which change(s) that leads to the risk event for the purpose of troubleshooting.

The rule mining engine 450 may attempt to discover the association rule(s) for each risk event based on two-dimensional (the change and time series dimensions) indicated by the change and risk models in the cluster 610. The rule mining engine 450 may extract slices of the 3D cubes of the change and risk models that are corresponding to the specific risk event. Thus, with a specific risk event fixed in the risk event dimension, the changes applied in the computing environments over the time series may be extracted from the change and risk models in the cluster 610. Change-time point pairs may be analyzed against the specific risk event, to determine whether there is an association rule for the risk event.

At block 730, the rule mining engine 450 attempts to determine one or more association rules for each time point in the time series dimension. An association rule for a specific fixed change in the time series dimension may indicate an association relationship between one or more changes and one or more risk events. From this association rule, it can be determined that a change and its associated risk event are correlated with each other such that the risk event will always occur if the associated change is applied to a computing environment, or the change can be found to be applied to the computing environment if the risk event occurs in the computing environment. Such an association rule may be used for predicting an upcoming risk event that will be brought in by implementing a change or for RCA when a risk event is reported in the computing environment.

The rule mining engine 450 may attempt to discover the association rule(s) for each time point based on two-dimensional (the change and risk event dimensions) indicated by the change and risk models in the cluster 610. The rule mining engine 450 may extract slices of the 3D cubes of the change and risk models that are corresponding to the specific time point. Thus, with a specific time point fixed in the time series dimension, the changes applied to, and the risk events occurred in the computing environments at the time point may be extracted from the change and risk models in the cluster 610. Change-risk event pairs may be analyzed against the specific time point, to determine whether there is an association rule for the time point.

The rule mining engine 450 may employ various association rule mining techniques to determine the two-dimensional association rules. Association rule mining is a well-known data mining technique used to find association relationships between items (changes, and/or risk events, and/or time points) in two dimensions. Association rule learning is a type of unsupervised learning technique that checks for association of one item on another item.

There are various association rule mining algorithms that can be used to discover the association rules between two dimensions with one fixed item in one dimension. Some examples of the association rule mining algorithms may include the Apriori algorithm, the F-P growth algorithm which stands for Frequent Pattern, the Eclat algorithm, which stands for Equivalence Class Transformation, and so on.

It would be appreciated that in some cases, for change and risk models in a cluster 610, the rule mining engine 450 may not be able to discover an association rule for a specific change, risk event, and/or time point.

The association rules determined at blocks 710, 720, and 730 can indicate two-dimensional association relationship. In embodiments of the present disclosure, it is desired to explore association rules from the three dimensions, to indicate association relationships between changes and risk events over the time series. The rule mining engine 450 is further configured to determine a joint association rule by combining at least two of the plurality of association rules determined for a cluster 610. The joint association rule can thus indicate, from the three dimensions, an association relationship between changes and risk events over some time points of the time series.

Specifically, at block 740, the rule mining engine 450 compares the plurality of association rules to determine two or more association rule that can be combined together. In some embodiments, the rule mining engine 450 may determine whether two association rules are associated with a same change, a same risk event, and a same time point. The same change, risk event, and time point in the three dimensions means that the two association rules are associated with a same atomic dice of a 3D cube structure representing the generic change and risk model for the cluster. In such case, the rule mining engine 450 may determine that the two association rules can be combined together to form at least a part of the joint association rule. In some embodiments, the joint association rule may be combined from two or more association rules.

Since each association rule indicates an association relationship between items in two dimensions with a fixed item in the remaining dimension, the association rule association rule may be mapped to the 3D cube structure. Two association rules that can be combined together may be considered as connectable via the same atomic dice associated with the two association rules.

Figure 8:
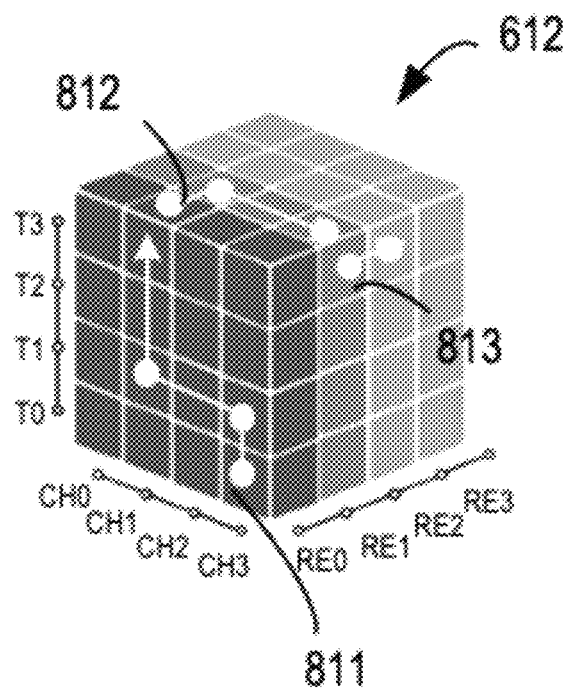
FIG. 8 depicts association rules to be jointed in a generic change and risk model according to some embodiments of the present disclosure.

FIG. 8 depicts association rules to be jointed in a generic change and risk model 612 according to some embodiments of the present disclosure. As illustrated in FIG. 8, an association rule 811 is specific to a risk event RE0 and is determined from R0 slices of 3D cube structures for different change and risk models. The association rule 811 indicates an association relationship represented as T0_CH3->T1_CH3->T1_CH1->T3_CH1, which means that the change CH3 applied sequentially at T0 and T1 as well as the change CH1 applied sequentially at T1 and T3 leads to the risk event RE0.

FIG. 8 also illustrates an association rule 812 that is specific to a time point T3 and is determined from T3 slices of 3D cube structures for different change and risk models. The association rule 812 indicates an association relationship represented as CH1-RE0->CH1_RE1->CH3 RE1, which means that at the time point T3, the implementation of the change CH1 may cause occurrence of risk events RE0 and RE1, the implementation of the change CH3 may cause occurrence of the risk event RE1. It is noted that the association between CH1 and RE0, RE1, and the association between CH3 and RE1 may not have a time order as they are related to the same time point of T3.

FIG. 8 also illustrates an association rule 813 that is specific to a change CH3 and is determined from CH3 slices of 3D cube structures for different change and risk models. The association rule 813 indicates an association relationship represented as T3 RE1->T3 RE2, which means that by applying the change CH3 at the time point T3, risk events RE1 and RE2 may occur. It is also noted that the association between CH3 and RE1, RE2 may not have a time order as they are related to the same time point of T3.

As can be seen from the 3D cube structure of the generic change and risk model 612, the joint atomic dice for the association rules 811 and 812 is (T3, CH1, RE0), and the joint atomic dice for the association rules 812 and 813 is (T3, CH3, RE1). Thus, the association rules 811, 812, and 813 may be combined together with the association rule 813 to form a joint association rule.

It would be appreciated that although three association rules are illustrated in FIG. 8, more or less association rules may be determined from the change and risk model in each cluster 610. In some embodiments, the rule mining engine 450 may determine different sets of association rules that can be combined together to form different joint association rules.

At block 750, the rule mining engine 450 determines at least one joint association rule based on the determined association rules. The rule mining engine 450 may generate a joint association rule from the association rules in each set that can be combined together.

In some embodiments, during the rule mining process, an association rule may be determined with a confidence score to indicate a confidence of the association relationship indicated by the association rule. The confidence indicates how often the association rule has been found to be true. The rule mining engine 450 may determine a joint confidence score based on the confidence scores of the association rules that are determined to be combined, for example, by multiplying the confidence scores with each other. The joint confidence score is compared with a confidence threshold. If the joint confidence score exceeds the confidence threshold, the rule mining engine 450 determines that the combination of the association rules can produce a valid joint association rule and then combine the association rules to form the joint association rule.

As an example, it is assumed that confidence scores for the association rules 811, 812, and 813 in the example of FIG. 8 are 100%, 90%, and 90%. The joint confidence score may be calculated as 100%*90%*90%=81%, which is higher than a predetermined confidence threshold of 80%. Then the rule mining engine 450 determines that the joint association rule is valid and thus may determine to generate and export the joint association rule combined from the three association rules.

For each cluster 610, the rule mining engine 450 may be configured to determine the association rules and then the joint association rule(s) according to the process 700. In some embodiments, the association rules and the joint association rule(s) may be stored in the rule storage 460 for use in risk analysis, which will be discussed in detail in the following.

Risk Analysis based on (Joint) Association Rules

The individual association rules can provide values in less complex scenarios, e.g., prediction of upcoming risk event given a specific change, RCA given a risk event, and so on. The joint association rules can provide values in multiple complex scenarios, e.g. automatic change management across computing environments for individual customers, risk analysis across computing environments, proactive change suggestion for individual computing environments, and so on. The joint association rule(s) and sometimes the association rules may be used to perform risk analysis.

The risk analysis engine 470 in the system 400 may be configured to perform the risk analysis based on the joint association rule(s) and sometimes the association rules stored in the rule storage 460. The risk analysis engine 470 may perform the analysis in response to an analysis request for a target computing environment. The target computing environment may be a computing environment from which a change and risk model is created, or any new computing environment.

As discussed above, in some embodiments, the change and risk models are clustered into different clusters depending on the characteristics of the computing environments, and the association rules and the joint association rules are generated for each cluster. In such a case, the risk analysis engine 470 may determine whether the joint association rule(s) and association rules generated for one cluster are suitable for use in the analysis against the target computing environment. Specifically, the risk analysis engine 470 may match a characteristic of the target computing environment with the characteristics of the computing environments in each cluster. If the characteristic of the target computing environment matches with the characteristics of the computing environments in a cluster, the risk analysis engine 470 may determine to use the joint association rule(s) and association rules generated for this cluster.

To perform the analysis, the analysis request may indicate information related to the target computing environment to facilitate the analysis. The information needed may depend on the requirements of the analysis and may indicate one or more changes previously applied to the target computing environment at one or more time points, one or more risk events occurred in the target computing environment at one or more time steps, and one or more changes that are expected to be applied to the target computing environment.

The risk analysis engine 470 may determine whether one or more joint association rules are applicable for the target computing environment by comparing the information indicated in the analysis request with the changes and the risk events indicated by the joint association rules. In the case that it is determined a joint association rule is applicable for the target computing environment, the rule analysis engine 470 may determine an analysis result for the target computing environment based on the joint association rule.

In some embodiments, in response to the analysis request, the association rules together with the joint association rule may be utilized together with the joint association rule by the rule analysis engine 470 to determine an analysis result. Similarly, the rule analysis engine 470 may also determine whether one or more of the association rules are applicable for the target computing environment by comparing the information with the changes and risk events indicated by the association rules. The rule analysis engine 470 may determine the analysis result based on the applicable association rules.

In an example embodiment, if the analysis request aims to perform an environment health check or if the analysis request aims to implement a target change to the target environment, the rule analysis engine 470 may collect information indicating one or more historical changes (if any) that are previously applied to the target environment, one or more risk events (if any) that are previously and/or currently occurred in the target environment. The rule analysis engine 470 may compare those changes and risk events in their time order with the changes and risk events indicated by the joint association rules and association rules.

If a joint association rule or an association rule is found to have changes and risk events matched with those related to the target computing environment, the rule analysis engine 470 may use the joint association rule to determine one or more risk events that may be brought in by one or more changes that have been applied. As such, corresponding actions may be provided to handle the risk events and to reduce the loss, which can thus achieve the purpose of environment heal check. If it is expected to implement the target change to the target computing environment, the rule analysis engine 470 may determine the steps about how to implement the change so as to avoid negative impacts by potential risk events.

In an example embodiment, if the analysis request aims to perform change risk analysis, the risk analysis engine 470 may collect information related to a specific change and to determine one or more (joint) association rules to determine one or more upcoming risk events if the specific change is applied.

Take the joint association rule illustrated in FIG. 8 as an example. In order to perform change risk analysis if the customer wants to apply a change "CH1" to the target environment. The risk analysis engine 470 collects information related to the target environment which indicates that a historical change CH3 followed with a historical change CH1 have been applied along with a risk event RE0 occurred in the target computing environment. The risk analysis engine 470 may then determines that the joint association rule is applicable for the target computing environment. The risk analysis engine 470 may then determine from the joint association rule in FIG. 8 that by applying the change CH1, the risk events RE0 and RE1 will occur in the target environment. Such an analysis result may allow the consumer or the provider of the target environment to decide whether the change "CH1" still needs to be applied and/or prepare suitable actions for the upcoming risk events when the change "CH1" is applied.

In an example embodiment, if the analysis request aims to perform RCA for changes and risk events, the risk analysis engine 470 may collect information for the specific changes and risk events and to determine one or more (joint) association rules to determine the root cause (for example, a previous change applied, or a risk event occurred) for the specific changes and risk events.

In some embodiments, the joint association rule(s) and the association rules may be included into different rule sets that are used for different analysis scenarios. The risk analysis engine 470 may determine the analysis scenario and use the joint association rule(s) and the association rules in the corresponding rule set to determine the analysis result.

It would be appreciated that some examples of usages of the association rules and joints association rules are provided above. Depending on the actual scenarios and practical requirements, the association rules and joints association rules may be flexibly utilized to perform risk and change management and analysis for computing environments. In some embodiments, the risk analysis engine 470 may apply machine learning technologies to perform the analysis based on the association rule. The scope of the present disclosure is not limited in this regard.

Figure 9:
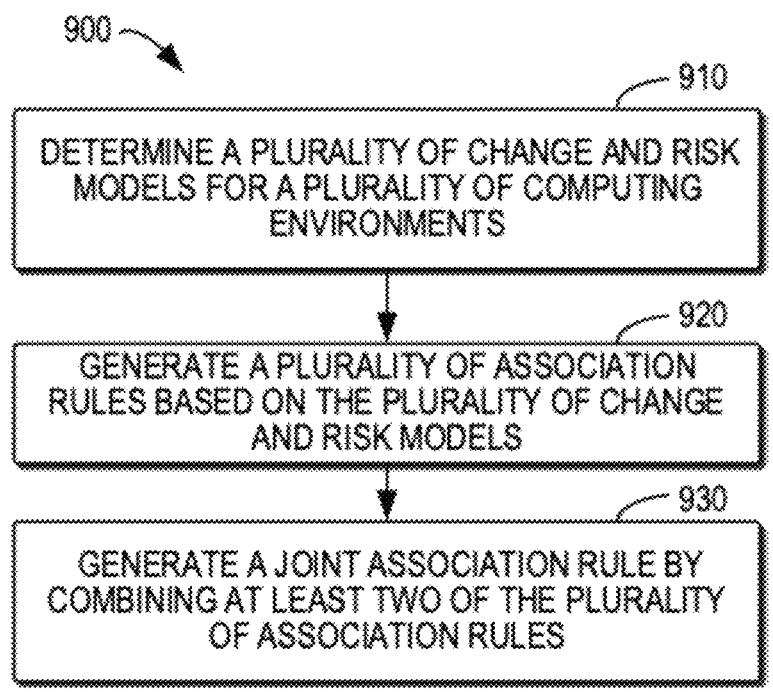
FIG. 9 depicts a flowchart of an example method according to some embodiments of the present disclosure.

FIG. 9 shows a flowchart of an example method 900 according to some embodiments of the present disclosure. The method 900 can be implemented at the system 400 as shown in FIG. 0.4. For the purpose of discussion, the method 900 will be described from the perspective of the system 400.

At block 910, the system 400 determines a plurality of change and risk models for a plurality of computing environments. Each change and risk model has three dimensions to indicate respective changes applied to one of the plurality of computing environments along with respective risk events occurred in the computing environment over a time series;

At block 920, the system 400 generates a plurality of association rules based on the plurality of change and risk models. Each of the plurality of association rules indicates, from two of the three dimensions, an association relationship between two of the following: at least one change, at least one risk event, and at least one time point of the time series; and At block 930, the system 400 generates a joint association rule by combining at least two of the plurality of association rules. The joint association rule indicates, from the three dimensions, an association relationship between changes and risk events over at least a part of the time series.

In some embodiments, generating the joint association rule comprises: determining, from the plurality of association rules, a first association rule and a second association rule that are associated with a same change, a same risk event, and a same time point in the time series; and combining the first and second association rules to form at least a part of the joint association rule.

In some embodiments, the first and second association rules are determined with a first confidence score and a second confidence score, respectively, to indicate respective confidences of the association relationships indicated by the first and second association rules. In some embodiments, combining the first and second association rules comprises: determining a joint confidence score based on the first confidence score and the second confidence score; and in accordance with a determination that the joint confidence score exceeds a confidence threshold, combining the first and second association rules to form at least a part of the joint association rule.

In some embodiments, the method further comprises: in response to an analysis request for a target computing environment, obtaining information related to the target computing environment, the information indicating at least one of the following: at least one change previously applied to the target computing environment at a first time point, at least one risk event occurred in the target computing environment at a second time step, and at least one change to be applied to the target computing environment; determining whether the joint association rule is applicable for the target computing environment by comparing the information with the changes and the risk events indicated by the joint association rule; and in accordance with a determination that the joint association rule is applicable, determining an analysis result for the target computing environment based on the joint association rule.

In some embodiments, determining the analysis result comprises: determining whether the plurality of association rules are applicable for the target computing environment by comparing the information with the changes and risk events indicated by the plurality of association rules; and in accordance with a determination that at least one of the plurality of association rules is applicable, determining the analysis result further based on the at least one association rule.

In some embodiments, comparing the information with the changes and the risk events indicated by the joint association rule comprises: matching a characteristic of the target computing environment with characteristics of the plurality of computing environments; and in accordance with a determination that the characteristic of the target computing environment matches with the characteristics of the plurality of computing environments, comparing, by one or more processors, the information with the changes and the risk events indicated by the joint association rule. In some embodiments, the characteristics of the plurality of computing environments match with each other.

In some embodiments, each change and risk model of the plurality of change and risk models is represented in a three-dimensional (3D) cube structure, and a slice of the 3D cube structure indicates one of the following: a change applied to a computing environment along with respective risk events occurred in the computing environment over a time series, respective changes applied to a computing environment along with a risk event occurred in the computing environment over a time series, and respective changes applied to a computing environment along with respective risk events occurred in the computing environment at a time point of a time series.

In some embodiments, each of the plurality of association rules is specific to a change, a risk event, or a time point in a remaining one of the three dimensions, and determining the plurality of change and risk models comprises at least one of the following: determining, by one or more processors, an association rule specific for a certain change based on respective slices of 3D cubes represented by the plurality of change and risk models and corresponding to the certain change; determining, by one or more processors, an association rule specific for a certain risk event based on respective slices of 3D cubes represented by the plurality of change and risk models and corresponding to the certain risk event; and determining, by one or more processors, an association rule specific for a certain time point based on respective slices of 3D cubes represented by the plurality of change and risk models and corresponding to the certain time point.

It should be noted that the processing of change management and risk analysis according to embodiments of this disclosure could be implemented by computer system/server 12 of FIG. 1. In some embodiments, the system 400 or one or more components of the system 400 could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing environment change, the method comprising:

determining, by a system operatively coupled to one or more processors, a plurality of change and risk models for a plurality of computing environments, wherein each change and risk model is three dimensional to indicate respective changes applied to one of the plurality of computing environments and respective risk events occurring in the computing environment over a time series;

generating, by the system, a plurality of association rules based on the plurality of change and risk models, wherein each of the plurality of association rules indicates a relationship between two items from the group consisting of one change, one risk event, and one time point of the time series;

generating, by the system, a joint association rule by combining at least two of the plurality of association rules, wherein the joint association rule indicates, in three dimensions, an association relationship between changes and risk events over at least a part of the time series;

determining, by the system, the one or more risk events that may arise by the one or more changes that have been applied; and determining, by the system, steps about how to implement the changes so as to avoid negative impacts by the one or more risk events, and implementing, by the system, actions to handle the one or more risk events that may result from the one or more changes in order to reduce loss.

2. The method of claim 1, wherein the generating the joint association rule comprises:

determining, by the system, a first association rule and a second association rule from the plurality of association rules that are associated with a same change, a same risk event, and a same time point in the time series; and combining, by the system, the first and second association rules to form at least a part of the joint association rule.

3. The method of claim 2, wherein the first and second association rules are determined with a first confidence score and a second confidence score, respectively, to indicate respective confidences of the association relationships indicated by the first and second association rules, and wherein combining the first and second association rules comprises:

determining, by the system, a joint confidence score based on the first confidence score and the second confidence score; and in accordance with a determination that the joint confidence score exceeds a confidence threshold, combining, by the system, the first and second association rules to form at least a part of the joint association rule.

4. The method of claim 1, further comprising:
in response to an analysis request for a target computing environment, by the system, information related to the target computing environment, wherein the information indicates at least one item from the group consisting of: one change previously applied to the target computing environment at a first time point, one risk event occurred in the target computing environment at a second time step, and one change to be applied to the target computing environment;
determining, by the system, whether the joint association rule is applicable for the target computing environment by comparing the information with the changes and the risk events indicated by the joint association rule; and
in accordance with a determination that the joint association rule is applicable, determining, by the system, an analysis result for the target computing environment based on the joint association rule.

5. The method of claim 4, wherein determining the analysis result comprises:
determining, by the system, whether the plurality of association rules are applicable for the target computing environment by comparing the information with the changes and risk events indicated by the plurality of association rules; and
in accordance with a determination that at least one of the plurality of association rules is applicable, determining, by the system, the analysis result further based on the at least one association rule.

6. The method of claim 4, wherein comparing the information with the changes and the risk events indicated by the joint association rule comprises:
matching a characteristic of the target computing environment with characteristics of the plurality of computing environments; and
in accordance with a determination that the characteristic of the target computing environment matches the characteristics of the plurality of computing environments, comparing, by the system, the information with the changes and the risk events indicated by the joint association rule.

7. The method of claim 1, wherein each change and risk model of the plurality of change and risk models is represented in a three-dimensional (3D) cube structure, and a slice of the 3D cube structure indicates one item from the group consisting of a change applied to a computing environment along with respective risk events that occurred in the computing environment over a time series, respective changes applied to a computing environment along with a risk event that occurred in the computing environment over a time series, and respective changes applied to a computing environment along with respective risk events that occurred in the computing environment at a time point of a time series.

8. The method of claim 7, wherein each of the plurality of association rules is specific to a change, a risk event, or a time point in a remaining one of the three dimensions, and wherein determining the plurality of change and risk models comprises at least one action from the group consisting of:
determining, by the system, an association rule specific for a certain change based on respective slices of 3D cubes represented by the plurality of change and risk models and corresponding to the certain change;
determining, by the system, an association rule specific for a certain risk event based on respective slices of 3D cubes represented by the plurality of change and risk models and corresponding to the certain risk event; and
determining, by the system, an association rule specific for a certain time point based on respective slices of 3D cubes represented by the plurality of change and risk models and corresponding to the certain time point.

9. A computer system for managing environmental change, the computer system comprising:
one or more computer processors, one or more computer-readable storage media, and program instructions stored on the one or more of the computer-readable storage media for execution by at least one of the one or more computer processors capable of performing a computer-implemented method, the computer-implemented method comprising:
determining a plurality of change and risk models for a plurality of computing environments, each change and risk model having three dimensions to indicate respective changes applied to one of the plurality of computing environments along with respective risk events occurred in the computing environment over a time series;
generating a plurality of association rules based on the plurality of change and risk models, each of the plurality of association rules indicating, from two of the three dimensions, an association relationship between two of the following: at least one change, at least one risk event, and at least one time point of the time series;
generating a joint association rule by combining at least two of the plurality of association rules, wherein the joint association rule indicates, from the three dimensions, an association relationship between changes and risk events over at least a part of the time series;
determining the one or more risk events that may arise by the one or more changes that have been applied; and
determining steps about how to implement the changes so as to avoid negative impacts by the one or more risk events, and implementing actions to handle the one or more risk events that may result from the one or more changes in order to reduce loss.

10. The computer system of claim 9, wherein generating the joint association rule comprises:
determining, by the one or more computer processors, a first association rule and a second association rule from the plurality of association rules that are associated with a same change, a same risk event, and a same time point in the time series; and
combining, by the one or more computer processors, the first and second association rules to form at least a part of the joint association rule.

11. The computer system of claim 10, wherein the first and second association rules are determined with a first confidence score and a second confidence score, respectively, to indicate respective confidences of the association relationships indicated by the first and second association rules, and wherein combining the first and second association rules comprises:
determining, by the one or more computer processors, a joint confidence score based on the first confidence score and the second confidence score; and
in accordance with a determination that the joint confidence score exceeds a confidence threshold, combining, by the one or more computer processors, the first and second association rules to form at least a part of the joint association rule.

12. The computer system of claim 9, further comprising:
in response to an analysis request for a target computing environment, obtaining, by one or more processors, information related to the target computing environment, wherein the information indicates at least one item from the group consisting of one change previously applied to the target computing environment at a first time point, one risk event occurred in the target computing environment at a second time step, and one change to be applied to the target computing environment;
determining, by the one or more computer processors, whether the joint association rule is applicable for the target computing environment by comparing the information with the changes and the risk events indicated by the joint association rule; and
in accordance with a determination that the joint association rule is applicable, determining, by the one or more computer processors, an analysis result for the target computing environment based on the joint association rule.

13. The computer system of claim 12, wherein determining the analysis result comprises:
    determining, by the one or more computer processors, whether the plurality of association rules are applicable for the target computing environment by comparing the information with the changes and risk events indicated by the plurality of association rules; and
    in accordance with a determination that at least one of the plurality of association rules is applicable, determining, by the one or more computer processors, the analysis result further based on the at least one association rule.

14. The computer system of claim 12, wherein comparing the information with the changes and the risk events indicated by the joint association rule comprises:
    matching a characteristic of the target computing environment with characteristics of the plurality of computing environments; and
    in accordance with a determination that the characteristic of the target computing environment matches the characteristics of the plurality of computing environments, comparing, by the one or more computer processors, the information with the changes and the risk events indicated by the joint association rule.

15. The computer system of claim 9, wherein each change and risk model of the plurality of change and risk models is represented in a three-dimensional (3D) cube structure, and a slice of the 3D cube structure indicates one item from the group consisting of a change applied to a computing environment along with respective risk events that occurred in the computing environment over a time series, respective changes applied to a computing environment along with a risk event that occurred in the computing environment over a time series, and respective changes applied to a computing environment along with respective risk events that occurred in the computing environment at a time point of a time series.

16. The computer system of claim 15, wherein each of the plurality of association rules is specific to a change, a risk event, or a time point in a remaining one of the three dimensions, and wherein determining the plurality of change and risk models comprises at least one action from the group consisting of:
    determining, by the one or more computer processors, an association rule specific for a certain change based on respective slices of 3D cubes represented by the plurality of change and risk models and corresponding to the certain change;
    determining, by the one or more computer processors, an association rule specific for a certain risk event based on respective slices of 3D cubes represented by the plurality of change and risk models and corresponding to the certain risk event; and
    determining, by the one or more computer processors, an association rule specific for a certain time point based on respective slices of 3D cubes represented by the plurality of change and risk models and corresponding to the certain time point.

17. A computer program product for managing environment change, the computer program product comprising:
    one or more non-transitory computer-readable storage media and program instructions stored on the one or more non-transitory computer-readable storage media capable of performing a method, the method comprising:
    determining a plurality of change and risk models for a plurality of computing environments, each change and risk model having three dimensions to indicate respective changes applied to one of the plurality of computing environments along with respective risk events occurred in the computing environment over a time series;
    generating a plurality of association rules based on the plurality of change and risk models, each of the plurality of association rules indicating, from two of the three dimensions, an association relationship between two of the following: at least one change, at least one risk event, and at least one time point of the time series;
    generating a joint association rule by combining at least two of the plurality of association rules, wherein the joint association rule indicates, from the three dimensions, an association relationship between changes and risk events over at least a part of the time series;
    determining the one or more risk events that may arise by the one or more changes that have been applied; and
    determining steps about how to implement the changes so as to avoid negative impacts by the one or more risk events, and implementing actions to handle the one or more risk events that may result from the one or more changes in order to reduce loss.

18. The computer program product of claim 17, wherein generating the joint association rule comprises:
    determining, by one or more processors, a first association rule and a second association rule from the plurality of association rules that are associated with a same change, a same risk event, and a same time point in the time series; and
    combining, by one or more processors, the first and second association rules to form at least a part of the joint association rule.

19. The computer program product of claim 18, wherein the first and second association rules are determined with a first confidence score and a second confidence score, respectively, to indicate respective confidences of the association relationships indicated by the first and second association rules, and wherein combining the first and second association rules comprises:
    determining, by one or more processors, a joint confidence score based on the first confidence score and the second confidence score; and
    in accordance with a determination that the joint confidence score exceeds a confidence threshold, combining, by one or more processors, the first and second association rules to form at least a part of the joint association rule.

20. The computer program product of claim 17, further comprising:

in response to an analysis request for a target computing environment, obtaining, by one or more processors, information related to the target computing environment, wherein the information indicates at least one item from the group consisting of one change previously applied to the target computing environment at a first time point, one risk event occurred in the target computing environment at a second time step, and one change to be applied to the target computing environment;

determining, by one or more processors, whether the joint association rule is applicable for the target computing environment by comparing the information with the changes and the risk events indicated by the joint association rule; and in accordance with a determination that the joint association rule is applicable, determining, by one or more processors, an analysis result for the target computing environment based on the joint association rule.

* * * * *